United States Patent [19]

Maiello

[11] Patent Number: 5,806,760
[45] Date of Patent: Sep. 15, 1998

[54] FURNACE CONTROLLER USEABLE, WITHOUT MODIFICATION, WITH EITHER A SINGLE OR TWO STAGE THERMOSTAT

[75] Inventor: Dennis R. Maiello, Fort Smith, Ark.

[73] Assignee: Rheem Manufacturing Company, New York, N.Y.

[21] Appl. No.: 842,759

[22] Filed: Apr. 17, 1997

[51] Int. Cl.⁶ .................................................. F24D 5/00
[52] U.S. Cl. .......................... 236/11; 236/1 E; 165/260; 62/298
[58] Field of Search ................................... 236/11, 1 EA, 236/1 EB, 1 E, 46 E, 51, 10; 62/196.2, 228.5, 298; 165/256, 260, 261, 262

[56] References Cited

U.S. PATENT DOCUMENTS

| | | | |
|---|---|---|---|
| 3,677,335 | 7/1972 | Weatherston | 165/12 |
| 4,638,942 | 1/1987 | Ballard et al. | 236/10 |
| 5,022,460 | 6/1991 | Brown | 236/51 X |
| 5,065,813 | 11/1991 | Berkeley et al. | 62/298 X |
| 5,176,006 | 1/1993 | Ikawa et al. | 236/51 X |
| 5,271,556 | 12/1993 | Helt et al. | 236/11 |
| 5,299,432 | 4/1994 | Nakae et al. | 62/298 |
| 5,316,073 | 5/1994 | Klaus et al. | 165/11.1 |
| 5,326,025 | 7/1994 | Dempsey et al. | 236/11 |
| 5,337,952 | 8/1994 | Thompson | 236/10 |
| 5,340,028 | 8/1994 | Thompson | 236/10 |

*Primary Examiner*—Harry B. Tanner
*Attorney, Agent, or Firm*—Konneker & Smith, P.C.

[57] ABSTRACT

An electronic two stage furnace controller may be used interchangeably, without modification thereof, with either a single or two stage thermostat to regulate the heating and cooling operation of a two stage heating/cooling furnace to which the controller is connected. The controller is operative to monitor the input it receives from the thermostat, automatically deduce whether the input is from a single stage thermostat or a two stage thermostat, and responsively regulate the operation of the furnace under a corresponding single stage thermostat heating or cooling mode, or a corresponding two stage thermostat heating or cooling mode.

27 Claims, 4 Drawing Sheets

FURNACE CONTROLLER USEABLE, WITHOUT MODIFICATION, WITH EITHER A SINGLE OR TWO STAGE THERMOSTAT

BACKGROUND OF THE INVENTION

The present invention generally relates to heat transfer apparatus and, in a preferred embodiment thereof, more particularly provides a controller useable in conjunction with either a single or two stage thermostat to regulate the operation of a two stage heating and cooling furnace.

To regulate the operation of, for example, a two stage heating and cooling furnace it is conventional to utilize a two stage electronic controller operatively interconnected between the furnace and a two stage heating/cooling thermostat. During the heating cycle the thermostat, upon sensing a need for heating in the conditioned space served by the furnace, first transmits to the W1 terminal of the controller a low heating demand signal and the controller responsively energizes the first heating stage of the furnace. Under high heat demand conditions, or if the first stage of heating is insufficient, the thermostat subsequently outputs a high heat demand signal to the W2 terminal of the controller which responsively energizes the second, higher heat output stage of furnace heating.

In a cooling cycle the two stage thermostat and the electronic controller operate in the same manner, with the thermostat initially transmitting to the Y1 terminal of the controller a low cooling demand signal. Under high cooling demand conditions, or if the first stage of cooling is insufficient, the thermostat subsequently outputs a high cooling demand signal to the Y2 terminal of the controller which responsively energizes the second, higher cooling output stage of furnace cooling.

It is often necessary or desirable to utilize the two stage electronic microprocessor-based controller with a single stage thermostat—for example when a single stage heating/cooling furnace is to be replaced with a new two stage heating/cooling furnace and it is desired to use an existing single stage thermostat with the new furnace. Or, a new single stage thermostat may be used with the new controller and furnace as a cost reduction measure.

A problem encountered when a single stage thermostat is used in conjunction with a conventional two stage controller of the general type described above is that the controller can be "fooled" when the single stage thermostat is connected thereto. Specifically, when a single stage heating thermostat is used, only a single heating demand signal is transmitted from the thermostat to the controller, and the controller may be programmed to sequentially energize the first and second furnace heating stages on its own after a predetermined delay. The problem, however, is how to get the controller to differentiate between a signal received at the controller input terminal W1 from a single stage heating thermostat, and a signal received at the controller input terminal W1 from a two stage thermostat. This problem, of course, is also present under the cooling cycle as to the thermostat cooling demand signal received at the Y1 controller input terminal.

Two approaches have previously been proposed to solve this single stage thermostat/two stage furnace controller interface problem. The first approach is to provide the controller with a mechanical switch that may be field set to indicate to the controller that it is (1) connected to a single stage thermostat, or (2) connected to a two stage thermostat. This approach has two primary disadvantages. First, it requires the increased expense of an additional input to the controller processor. Second, it carries with it the potential for incorrect field setting by the installer—for example, setting the switch for a single stage thermostat when a two stage thermostat is actually connected to the controller, and vice versa.

The second previously proposed approach to the single stage thermostat/two stage controller interface problem is illustrated and described in U.S. Pat. No. 5,271,556 to Helt et al which is directed to an integrated furnace control. To provide the furnace microprocessor controller with the ability to discern whether it is connected to a single stage or two stage heating thermostat, a jumper is interconnected between the controller's W1 and W2 terminals when a single stage thermostat is being used, and is removed from the controller when a two stage thermostat is being used. When a single stage thermostat is being used, and connected to the W1 controller terminal, when the thermostat outputs a heating demand signal to the W1 controller terminal the controller (because of the previously installed jumper) senses a simultaneous heating demand signal to both the W1 and W2 terminals. From this the controller deduces that the thermostat cannot be a two stage thermostat (because a two stage thermostat would sequentially energize the W1 and W2 terminals), and itself sequentially activates the first and second furnace heating stages in accordance with a predetermined staged heating routine.

This second approach carries with it the disadvantages of requiring additional field labor in modifying the controller, and the possibility of incorrectly setting the controller—for example, installing the jumper when a two stage thermostat is connected to the controller, or leaving the jumper off when a single stage thermostat is connected to the controller.

It can be seen from the foregoing that it would be desirable to provide an improved two stage furnace controller which may be interchangeably used with either a single or two stage thermostat, and in which the above-mentioned disadvantages associated with conventional two stage furnace controllers are eliminated or at least substantially reduced. It is accordingly an object of the present invention to provide such an improved two stage furnace controller.

SUMMARY OF THE INVENTION

In carrying out principles of the present invention, in accordance with a preferred embodiment thereof, improved heat transfer apparatus is provided which comprises a heat transfer device having a first heat transfer rate stage and a second, higher heat transfer rate stage, and a specially designed controller connected to the heat transfer device. The controller is connectable to either a single stage thermostat or a two stage thermostat and is operative to receive at least one heat transfer rate demand signal from the thermostat to which it is connected and responsively regulate the operation of the heat transfer device in a two stage mode.

Representatively, the heat transfer device is a fuel-fired air heating/cooling furnace having first and second heating stages, and first and second cooling stages, and the controller is a microprocessor-based electronic controller. However, as will be appreciated, the principles of the present invention are applicable to other types of heat transfer devices, including liquid heating and cooling devices, and other types of controller constructions.

In a preferred embodiment thereof, the controller includes a first thermostat input portion for receiving a thermostat-generated low heat transfer rate demand signal; a second thermostat input portion for receiving a thermostat-generated high heat transfer rate demand signal; and control means.

The control means are operative, without modification of the controller, to (1) automatically determine, by interpreting signal receipt at the first and second thermostat input portions, whether the controller is connected to a single stage thermostat or a two stage thermostat; (2) generate a first control output useable to regulate the operation of the heat transfer device in a first mode when the controller is connected to a two stage thermostat; and (3) generate a second control output useable to regulate the operation of the heat transfer device in a second mode when the controller is connected to a single stage thermostat.

Preferably, the thermostat "type" detection portion of the control means operation is carried out by causing the control means to recognize the thermostat to which the controller is connected as a two stage thermostat when the low heat transfer rate demand signal is received by the controller without the receipt of the high heat transfer rate demand signal, and to recognize the thermostat as a single stage thermostat when the high heat transfer rate demand signal is received by the controller without the receipt of the low heat transfer rate demand signal.

The controller has low and high heating thermostat input terminals (respectively designated as WL and WH), and low and high cooling thermostat terminals (respectively designated as YL and YH). To operatively connect a conventional two stage heating and cooling thermostat to the controller, the low and high thermostat heating output terminals W1 and W2 are respectively connected to the controller input terminals WL and Wh, and the low and high thermostat cooling output terminals Y1 and Y2 are respectively connected to the controller input terminals YL and YH. To operatively connect a conventional single state heating and cooling thermostat to the controller, the lone thermostat heating output terminal W is connected to the controller input terminal WH, and the lone thermostat cooling output terminal Y is connected to the controller input terminal YH.

Under the heating cycle of the representative air heating/cooling furnace, when a two stage thermostat is operatively connected to the controller, the first or "two stage thermostat" operating mode comprises initiating the first heating stage of the furnace in response to the detection by the control means of receipt of a thermostat-generated heat transfer demand signal at the WL controller terminal, and thereafter initiating operation of the second furnace heating stage in response to the detection by the control means of receipt of an additional thermostat-generated heat transfer demand signal at WH controller terminal. When a single stage thermostat is operatively connected to the controller, the second or "single stage thermostat" operating mode comprises initiating the first heating stage of the furnace in response to the detection by the control means of receipt of a thermostat-generated heat transfer demand signal only at the WH controller terminal, and thereafter initiating operation of the second furnace heating stage after a predetermined delay period.

Under the cooling cycle of the representative air heating/cooling furnace, when a two stage thermostat is operatively connected to the controller, the first or "two stage thermostat" operating mode comprises initiating the first cooling stage of the furnace in response to the detection by the control means of receipt of a thermostat-generated heat transfer demand signal at the YL controller terminal, and thereafter initiating operation of the second furnace cooling stage in response to the detection by the control means of receipt of an additional thermostat-generated heat transfer demand signal at YH controller terminal. When a single stage thermostat is operatively connected to the controller, the second or "single stage thermostat" operating mode comprises initiating the first cooling stage of the furnace in response to the detection by the control means of receipt of a thermostat-generated heat transfer demand signal only at the YH controller terminal, and thereafter initiating operation of the second furnace cooling stage after a predetermined delay period.

DETAILED DESCRIPTION

Figure 1:
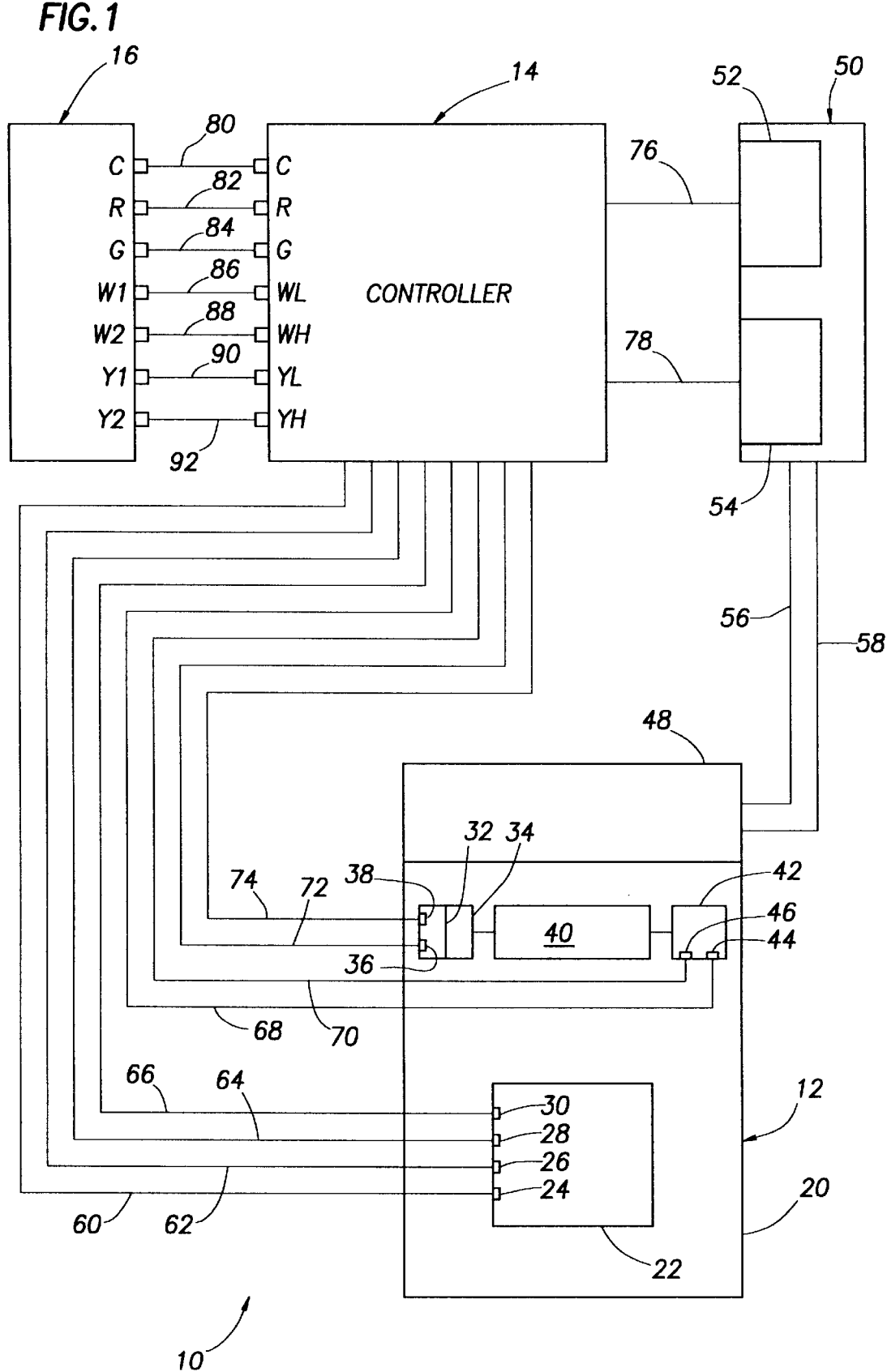
FIG. 1 is a schematic wiring diagram illustrating the interconnection between a two stage heating/cooling thermostat and a two stage heating/cooling furnace of a specially designed furnace controller embodying principles of the present invention.
Figure 2:
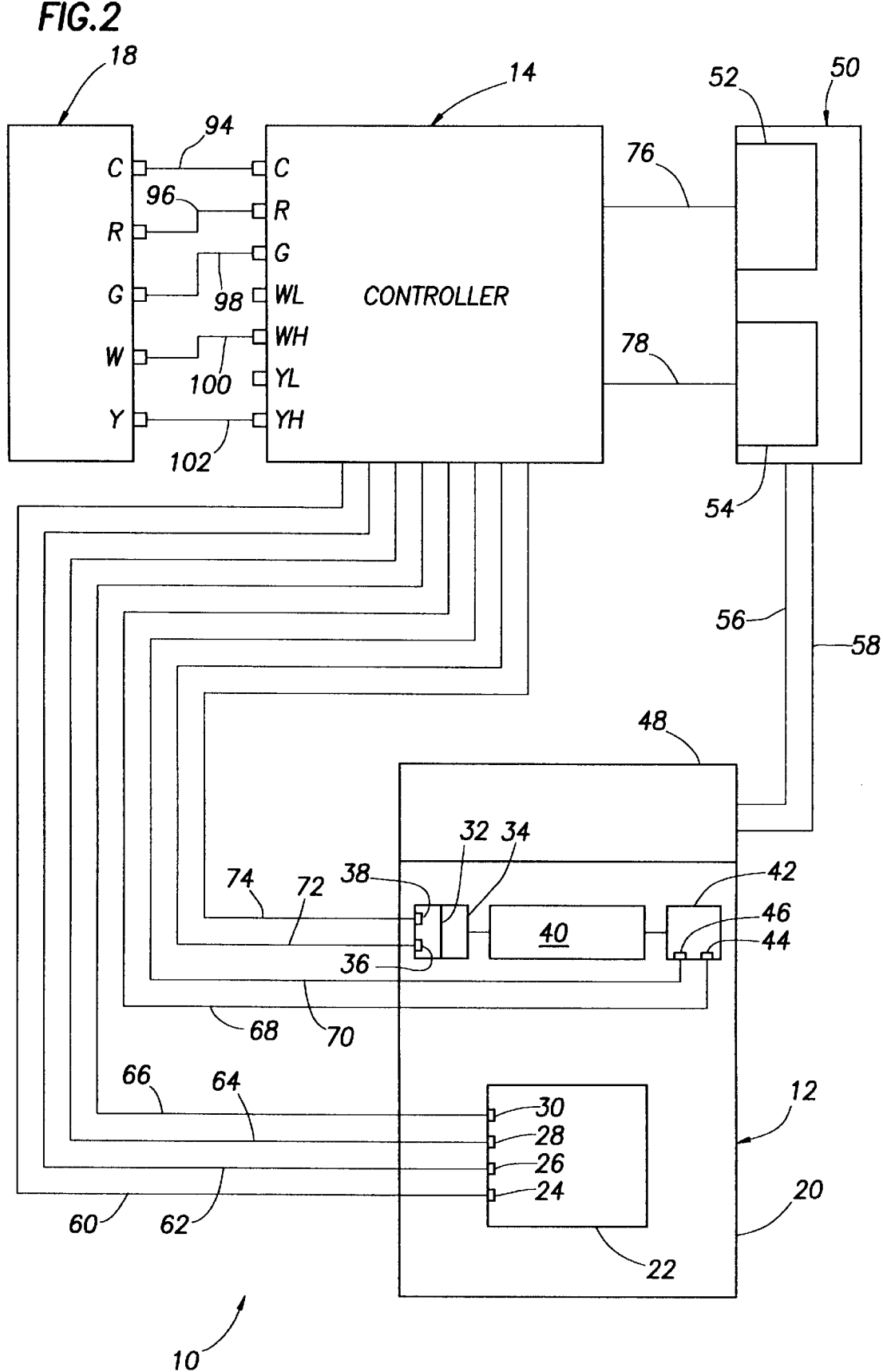
FIG. 2 is a schematic wiring diagram similar to that in FIG. 1, but with a single stage heating/cooling thermostat being connected to the furnace controller in place of the two stage heating/cooling thermostat shown in FIG. 1.

Schematically illustrated in FIGS. 1 and 2 is an improved heat transfer system 10 that includes a heat transfer device 12, representatively in the form of a fuel-fired, two-stage air heating/cooling furnace 12, and a specially designed electronic, microprocessor-based furnace controller 14 connected to the furnace 12 and embodying principles of the present invention.

According to a primary aspect of the invention, the controller 14 is interchangeably connectable to either a two stage heating and cooling thermostat 16 (see FIG. 1) or a single stage heating and cooling thermostat 18 (see FIG. 2). In a manner subsequently described herein, controller 14, without modification thereof, is able to automatically discern whether a single or two stage thermostat is being used, and responsively regulate the operation of the furnace 12 in a first two stage heating and cooling mode if the two stage thermostat 16 is being used, or a second two stage heating and cooling mode if the single stage thermostat 18 is being used.

The representative furnace 12 is of a generally conventional construction and includes a housing 20. A supply air fan or indoor blower unit 22 is disposed within a bottom portion of the housing 20 and has, on its motor portion, four electrical fan speed control input terminals—a low speed heating terminal 24, a high speed heating terminal 26, a low speed cooling terminal 28, and a high speed cooling terminal 30.

Positioned above the indoor blower 22 within the furnace housing 20 are, from left to right, a gas valve 32 operatively coupled to a gas burner structure 34 and having low and high fire electrical input terminals 36 and 38; a combustion heat exchanger 40 associated with the burner structure 34; and a draft inducer fan 42 having a low speed terminal 44 and a high speed terminal 46. A direct expansion type refrigerant cooling coil structure 48 is mounted on the top end of the housing 20 and is operatively connected to an outdoor condensing unit 50, having selectable first and second cooling stages 52 and 54, by refrigerant and suction lines 56 and 58.

During operation of the representative furnace 12, the indoor blower 22 draws air into the housing 20 from the conditioned spaced served by the furnace and forces the air upwardly through the housing 20, across the heat exchanger 40 and the cooling coil 48, and then outwardly through the top end of the housing 20 for return to the conditioned space. Under the heating cycle of the furnace 12, the supply air interiorly traversing the housing 20 is heated by the heat exchanger 40 before being returned to the conditioned space, and under the cooling cycle of the furnace the supply air is cooled by the cooling coil 48 before being returned to the conditioned space.

Still referring to FIGS. 1 and 2, the output side of the microprocessor-based electronic furnace controller 14 is operatively connected to the furnace 12 and associated condensing unit 50 by various electrical control leads which, as illustrated, include (1) leads 60,62,64 and 66 respectively connected to the indoor blower terminals 24,26,28 and 30; (2) leads 68 and 70 respectively connected to the draft inducer fan terminals 44 and 46; (3) leads 72 and 74 respectively connected to the gas valve terminals 36 and 38; and (4) leads 76 and 78 respectively connected to the first and second condenser cooling stages 52 and 54.

On the input side of the controller 14 are the conventional "C", "R" and "G" input terminals in addition to (1) a low heating demand input terminal WL, (2) a high heating demand input terminal WH, (3) a low cooling demand input terminal YL, and (4) a high cooling demand input terminal YH.

Turning now to FIG. 1, the illustrated two stage heating and cooling thermostat 16 is of a conventional construction and operation, and, in addition to the indicated "C", "R" and "G" output terminals, has (1) a low heating demand output terminal W1, (2) a high heating demand output terminal WH, (3) a low cooling demand output terminal Y1, and (4) a high cooling demand output terminal Y2.

When the heating cycle of the two stage thermostat 16 is selected, upon sensing the need for heating in the conditioned space the thermostat 16 is operative to initially output a low heat demand signal from its W1 terminal for use in initiating the low heating stage of the heat transfer device to which thermostat 16 is connected. If the heating demand of the conditioned space is not satisfied within a predetermined delay period by the heat transfer device, the thermostat 16 automatically outputs an additional high heat demand signal from its W2 terminal which is useable to switch the heat transfer device from its low heating stage to its high heating stage.

Similarly, when the cooling cycle of the two stage thermostat 16 is selected, upon sensing the need for cooling in the conditioned space the thermostat 16 is operative to initially output a low cooling demand signal from its Y1 terminal for use in initiating the low cooling stage of the heat transfer device to which the thermostat 16 is connected. If the cooling demand of the conditioned space is not satisfied within a predetermined delay period by the heat transfer device, the thermostat 16 automatically outputs an additional high cooling demand signal from its Y2 terminal for use in switching the heat transfer device from its low cooling stage to its high cooling stage.

The single stage heating and cooling thermostat 18 shown in FIG. 2 is also of a conventional construction and operation and, in addition to the indicated "C", "R" and "G" output terminals, has a single heating demand output terminal W and a single cooling demand output terminal Y. As previously mentioned, the controller 14 is interchangeably connectable to either the two stage thermostat 16 (see FIG. 1) or the single stage thermostat 18 (see FIG. 2).

When the two stage heating and cooling thermostat 16 is connected to the controller 14 (see FIG. 1), the thermostat output terminals C,R,G,W1,W2,Y1 and Y2 are respectively coupled to the controller input terminals C,R,G,WL,WH,YL and YH by electrical leads 80,82,84,86,88,90 and 92. When the single stage heating and cooling thermostat 18 is connected to the controller 14 (see FIG. 2), the thermostat output terminals C,R,G,W and Y are respectively coupled to the controller input terminals C,R,G,WH and YH by electrical leads 94,96,98,100 and 102.

Figure 3:
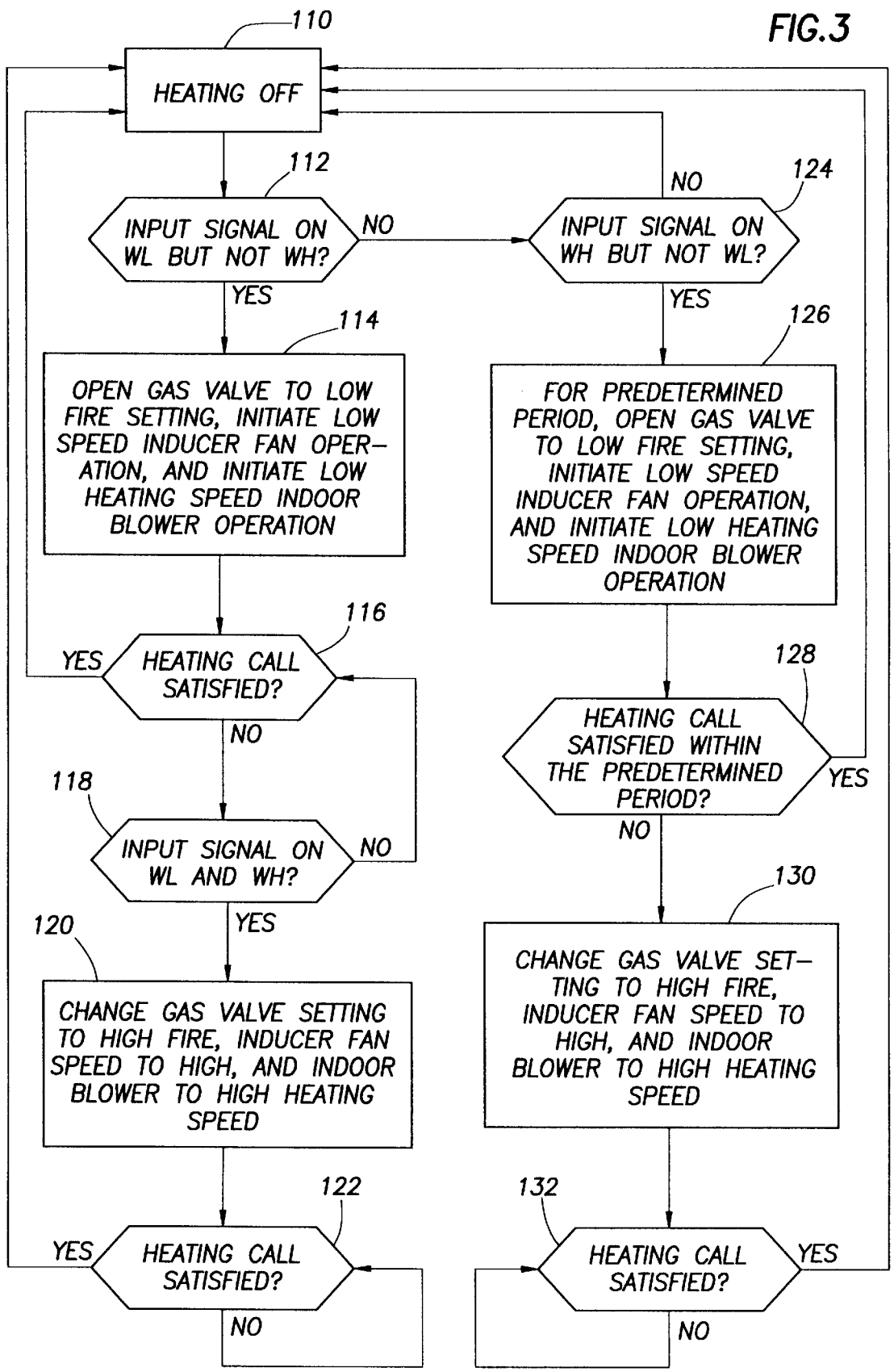
FIG. 3 is a schematic block flow diagram illustrating the operation of the controller during a furnace heating cycle.

As previously mentioned herein, the controller 14, without modification thereof, is able to automatically discern whether the two stage thermostat 16 or the single stage thermostat 18 is connected thereto, and responsively regulate the operation of the heating/cooling furnace 12 in a first two stage heating and cooling mode if the two stage thermostat 16 is being used, or a second two stage heating and cooling mode if the single stage thermostat 18 is being used. This unique capability of the controller 14 will first be demonstrated in conjunction with the controller heating cycle flow diagram of FIG. 3 in which (1) the left side of the diagram represents the manner in which the heating operation of the furnace 12 is regulated by the controller 14 in a first mode when the two stage thermostat 16 is connected to the controller, and (2) the right side of the diagram represents the manner in which the heating operation of the furnace 12 is regulated by the controller 14 in a second mode when the single stage thermostat 18 is connected to the controller.

When the heating cycle of the single or two stage thermostat is selected, from a heating off condition 110 the preprogrammed microprocessor portion of the controller 14 first queries, at step 112, whether there is a thermostat-generated input signal on controller input terminal WL but not on WH. If this condition is satisfied, the controller automatically determines that the two stage thermostat 16 is being used and, at step 114, initiates the first mode of two stage furnace heating regulation by energizing the furnace's first heating stage. More specifically, the controller 14 energizes the furnace's first heating stage by sending electrical control current respectively through controller output leads 72,68 and 60 to open the gas valve 32 to its low fire setting, initiate low speed operation of the draft inducer fan 42, and initiate low heating speed operation of the indoor blower 22.

Next, respectively at steps 116 and 118, the controller queries (1) whether this initial heating call has been satisfied, and (2) whether thermostat-generated input signals are being received at both of the controller input terminals WL and WH. If the initial heating call is satisfied before this latter condition is met, the controller returns the furnace 12 to its heating off condition 110. If, however, the initial heating call is not met prior to the receipt of input signals on both of the control terminals WL and WH, the controller proceeds to initiate, at step 120, the second, higher stage of furnace heating by de-energizing controller output leads 72,68 and 60, and energizing controller output leads 74,70 and 62, to thereby change the setting of the gas valve 32 to high fire, operate the draft inducer fan 42 at its high speed setting, and operate the indoor blower 22 at its high heating speed.

In the final step 122 of this first, or two stage thermostat mode of heating regulation of the furnace 12, the controller 14 queries whether the thermostat's heating call has been satisfied during this now-selected second heating stage of the furnace 12. If it has not, the controller permits the furnace 12 to continue to operate in its high heating mode. When the heating call is satisfied, the controller returns the furnace 12 to its heating off condition 110.

If at the initial query 112 the microprocessor/controller 14 determines that there is no thermostat-generated input signal being received by the controller input terminal WL, it then queries at step 124 whether a thermostat-generated input signal is being received at controller input terminal WH but not at input terminal WL. If this condition is not met, there is no heating call being made, and the controller maintains the furnace 12 in its heating off condition 110. If the condition is met, the controller automatically determines that the single stage thermostat 18 is connected thereto and, at step 126, initiates the second mode of two stage furnace heating regulation by energizing the furnace's first heating stage for a predetermined period, subject to this initial heating call being satisfied during such predetermined period. More specifically, the controller 14 energizes the furnace's first heating stage for the predetermined period by sending electrical control current respectively through controller output leads 72,68 and 60 to open the gas valve 32 to its low fire setting, initiate low speed operation of the draft inducer fan 42, and initiate low heating speed operation of the indoor blower 22.

After initiating the furnace's first heating stage in this manner, the controller queries at 128 whether the initial heating call by the single stage thermostat 18 has been satisfied in the predetermined first stage heating period. If it has, the controller returns the furnace 12 to its heating off condition 110. If the initial heating call is not satisfied before the predetermined first stage heating period ends, the controller at step 130 automatically initiates the second heating stage of the furnace by de-energizing controller output leads 72,68 and 60, and energizing controller output leads 74,70 and 62, to thereby change the setting of the gas valve 32 to high fire, operate the draft inducer fan 42 at its high speed setting, and operate the indoor blower 22 at its high heating speed.

In the final step 132 of this second, or single stage thermostat mode of heating regulation of the furnace 12, the controller 14 queries whether the thermostat's heating call has been satisfied during this now-selected second heating stage of the furnace 12. If it has not, the controller permits the furnace 12 to continue to operate in its high heating mode. When the heating call is satisfied, the controller returns the furnace 12 to its heating off condition 110.

Figure 4:
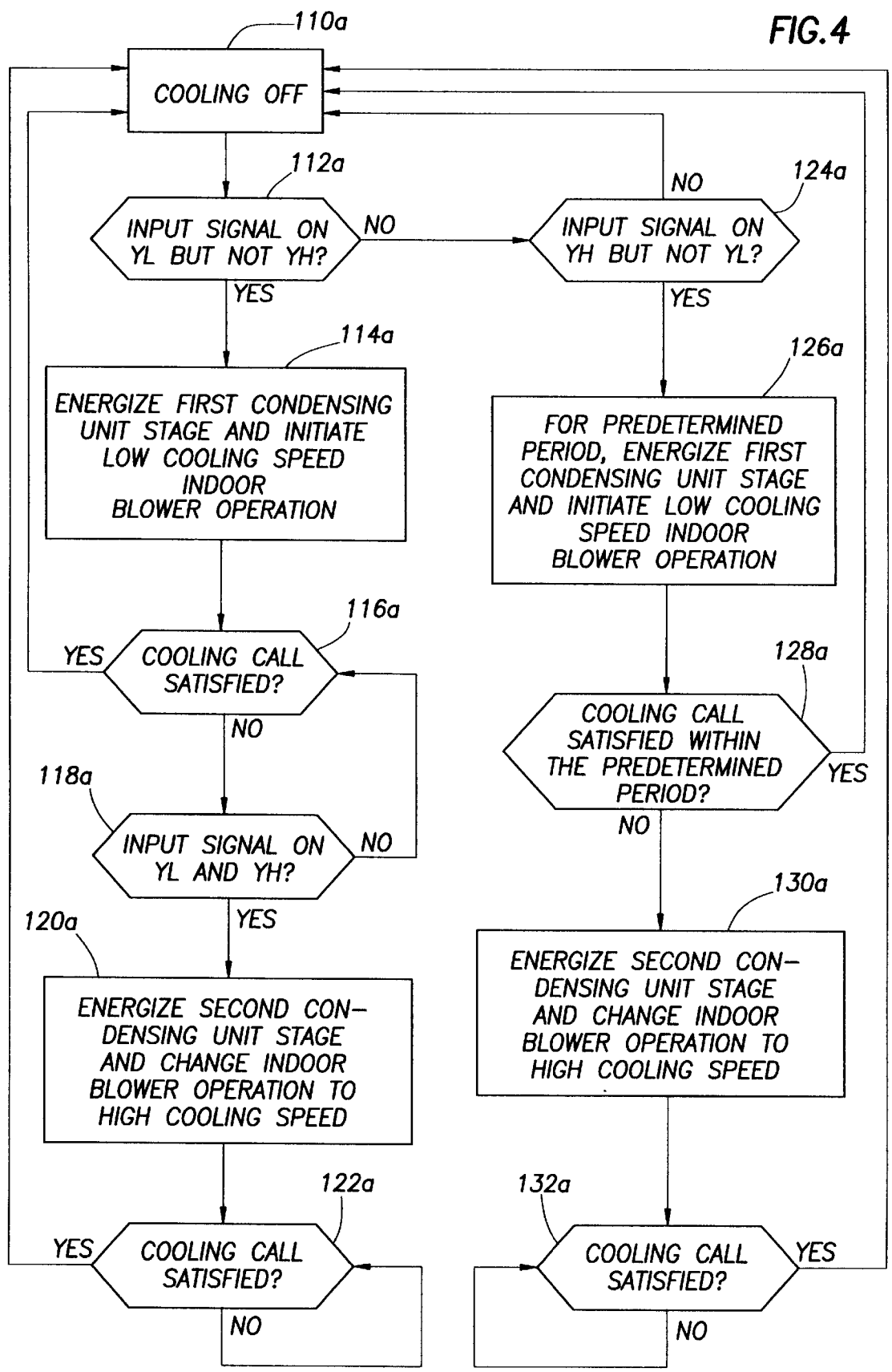
FIG. 4 is a schematic block flow diagram illustrating the operation of the controller during a furnace cooling cycle.

The block flow diagram in FIG. 4 illustrates the furnace cooling cycle operation of the controller 14, the steps in such cooling cycle being substantially similar to their counterparts in the heating cycle just described above. Accordingly, for ease of comparison to their heating step counterparts the cooling steps of the controller have been given the same reference numerals, but with the subscripts "a".

When the cooling cycle of the single or two stage thermostat is selected, from a cooling off condition 110a the preprogrammed microprocessor portion of the controller 14 first queries, at step 112a, whether there is a thermostat-generated input signal on controller input terminal YL but not on YH. If this condition is satisfied, the controller automatically determines that the two stage thermostat 16 is being used and, at step 114a, initiates the first mode of two stage furnace cooling regulation by energizing the furnace's first cooling stage. More specifically, the controller 14 energizes the furnace's first cooling stage by sending electrical control current respectively through controller output leads 76 and 28 to respectively energize the first condensing unit stage 52 and initiate low cooling speed operation of the indoor blower 22.

Next, respectively at steps 116a and 118a, the controller queries (1) whether this initial cooling call has been satisfied, and (2) whether thermostat-generated input signals are being received at both of the controller input terminals YL and YH. If the initial heating call is satisfied before this latter condition is met, the controller returns the furnace 12 to its cooling off condition 110a. If, however, the initial cooling call is not met prior to the receipt of input signals on both of the control terminals YL and YH, the controller proceeds to initiate, at step 120a, the second, higher stage of furnace cooling by de-energizing controller output lead 64, and energizing leads 78 and 66, to respectively energize the second condensing unit stage 54 and change the operation of the indoor blower 22 to its high cooling speed operation.

In the final step 122a of this first, or two stage thermostat mode of cooling regulation of the furnace 12, the controller 14 queries whether the thermostat's cooling call has been satisfied during this now-selected second cooling stage of the furnace 12. If it has not, the controller permits the furnace 12 to continue to operate in its high cooling mode. When the cooling call is satisfied, the controller returns the furnace 12 to its cooling off condition 110a.

If at the initial query 112a the microprocessor/controller 14 determines that there is no thermostat-generated input signal being received by the controller input terminal YL, it then queries at step 124a whether a thermostat-generated input signal is being received at controller input terminal YH but not at input terminal YL. If this condition is not met, there is no cooling call being made, and the controller maintains the furnace 12 in its cooling off condition 110a. If the condition is met, the controller automatically determines that the single stage thermostat 18 is connected thereto and, at step 126a, initiates the second mode of two stage furnace cooling regulation by energizing the furnace's first cooling stage for a predetermined period, subject to this initial cooling call being satisfied during such predetermined period. More specifically, the controller 14 energizes the furnace's first cooling stage for the predetermined period by sending electrical control current respectively through controller output leads 76 and 28 to respectively energize the first condensing unit stage 52 and initiate low cooling speed operation of the indoor blower 22.

After initiating the furnace's first cooling stage in this manner, the controller queries at 128a whether the initial cooling call by the single stage thermostat 18 has been satisfied in the predetermined first stage cooling period. If it has, the controller returns the furnace 12 to its cooling off condition 110a. If the initial cooling call is not satisfied before the predetermined first stage cooling period ends, the controller at step 130a automatically initiates the second cooling stage of the furnace by de-energizing controller output lead 64, and energizing leads 78 and 66, to respectively energize the second condensing unit stage 54 and change the operation of the indoor blower 22 to its high cooling speed operation.

In the final step 132a of this second, or single stage thermostat mode of cooling regulation of the furnace 12, the controller 14 queries whether the thermostat's cooling call has been satisfied during this now-selected second cooling stage of the furnace 12. If it has not, the controller permits the furnace 12 to continue to operate in its high cooling mode. When the cooling call is satisfied, the controller returns the furnace 12 to its cooling off condition 110a.

While the heat transfer system 10 has a fuel-fired air heating and cooling furnace 12 representatively incorporated therein, it will be readily appreciated by those of skill in this particular art that the principles of the present invention may also be applied to other types of air heat transfer devices, such as, for example, heat pumps and electric furnaces as well as liquid heat transfer devices such as hydronic heating and cooling systems. Additionally, while the illustrated single and two stage thermostats were representatively heating and cooling thermostats, it will be further appreciated that the principles of the present invention are also applicable to heating-only single and two stage thermostats and cooling-only single and two stage thermostats.

The foregoing detailed description is to be clearly understood as being given by way of illustration and example only, the spirit and scope of the present invention being limited solely by the appended claims.

What is claimed is:

1. A controller (1) connectable to a heat transfer device having a first heat transfer rate and a second, higher heat transfer rate, and (2) interchangeably connectable to either a single stage thermostat or a two stage thermostat, said controller being operative to receive at least one heat transfer rate demand signal from the thermostat to which it is connected and responsively regulate the operation of the heat transfer device, said controller comprising:

a first thermostat input portion for receiving a thermostat-generated low heat transfer rate demand signal;

a second thermostat input portion for receiving a thermostat-generated high heat transfer rate demand signal; and control means for monitoring said first and second thermostat input portions and (1) generating a first control output useable to regulate the operation of the heat transfer device in a two stage thermostat mode in response to the detection by said control means of the receipt of said low heat transfer rate demand signal without the receipt of said high heat transfer rate demand signal, and (2) generating a second control output useable to regulate the operation of the heat transfer device in a single stage thermostat mode in response to the detection by said control means of the receipt of said high heat transfer rate demand signal without the receipt of said low heat transfer rate demand signal.

2. The controller of claim 1 wherein said control means are operable in a single mode to monitor said first and second thermostat input portions and responsively generate the corresponding one of said first and second control outputs.

3. The controller of claim 1 wherein said controller is a furnace controller.

4. The controller of claim 1 wherein the heat transfer device is a heating furnace, and said high and low heat transfer rate demand signals are heating demand signals.

5. The controller of claim 4 wherein the heat transfer device is a fuel-fired heating furnace.

6. The controller of claim 1 wherein the heat transfer device is an air conditioning device, and said high and low heat transfer rate demand signals are cooling demand signals.

7. The controller of claim 6 wherein the heat transfer device is a heating/cooling furnace.

8. The controller of claim 1 wherein said control means include a preprogrammed microprocessor coupled to said first and second thermostat input portions and operative to automatically discern, via said monitoring of said input portions, whether said controller is connected to a single stage thermostat or a two stage thermostat.

9. The controller of claim 1 wherein said controller is an electronic furnace controller.

10. A controller (1) connectable to a heat transfer device having a first heat transfer rate and a second, higher heat transfer rate, and (2) interchangeably connectable to either a single stage thermostat or a two stage thermostat, said controller being operative to receive at least one heat transfer rate demand signal from the thermostat to which it is connected and responsively regulate the operation of the heat transfer device, said controller comprising:

a first thermostat input portion for receiving a thermostat-generated low heat transfer rate demand signal;

a second thermostat input portion for receiving a thermostat-generated high heat transfer rate demand signal; and control means operative without modification of said controller to:

(1) automatically determine, by interpreting signal receipt at said first and second thermostat input portions, whether said controller is connected to a single stage thermostat or a two stage thermostat, (2) generate a first control output useable to regulate the operation of the heat transfer device in a first mode when said controller is connected to a two stage thermostat, and (3) generate a second control output useable to regulate the operation of the heat transfer device in a second mode when said controller is connected to a single stage thermostat.

11. The controller of claim 10 wherein said controller is an electronic furnace controller.

12. The controller of claim 11 wherein said control means include a preprogrammed microprocessor.

13. Heat transfer apparatus comprising:

a heat transfer device having selectable first and second heat transfer rates, said second heat transfer rate being higher than said first heat transfer rate; and a controller connected to said heat transfer device and interchangeably connectable to either a single stage thermostat or a two stage thermostat, said controller being operative to receive at least one heat transfer rate demand signal from the thermostat to which it is connected and responsively regulate the operation of said heat transfer device, said controller including:

a first thermostat input portion for receiving a thermostat-generated low heat transfer rate demand signal, a second thermostat input portion for receiving a thermostat-generated high heat transfer rate demand signal, and control means for monitoring said first and second thermostat input portions and (1) generating a first control output operative to regulate the operation of said heat transfer device in a two stage thermostat mode in response to the detection by said control means of the receipt of said low heat transfer rate demand signal without the receipt of said high heat transfer rate demand signal, and (2) generating a second control output operative to regulate the operation of said heat transfer device in a single stage thermostat mode in response to the detection by said control means of the receipt of said high heat transfer rate demand signal without the receipt of said low heat transfer rate demand signal.

14. The heat transfer apparatus of claim 13 wherein said control means are operable in a single mode to monitor said first and second thermostat input portions and responsively generate the corresponding one of said first and second control outputs.

15. The heat transfer apparatus of claim 13 wherein said heat transfer device is a heating furnace, said first and second heat transfer rates are heating rates, and said high and low heat transfer rate demand signals are high and low heating demand signals.

16. The heat transfer apparatus of claim 15 wherein said furnace is a fuel-fired heating furnace.

17. The heat transfer apparatus of claim 15 wherein:
in said two stage thermostat mode said first control output first functions to initiate operation of said furnace at said first heating rate thereof, and is thereafter operative to initiate operation of said furnace at said second heating rate thereof in response to the detection by said control means of receipt of a thermostat-generated heat transfer demand signal at said second thermostat input portion of said controller, and
in said single stage thermostat mode said second control output first functions to initiate operation of said furnace at said first heating rate thereof, and is thereafter operative to initiate operation of said furnace at said second heating rate thereof after expiration of a predetermined delay period.

18. The heat transfer apparatus of claim 13 wherein said heat transfer device is a heating/cooling furnace, said first and second heat transfer rates are cooling rates, and said high and low heat transfer rate demand signals are high and low cooling demand signals.

19. The heat transfer apparatus of claim 18 wherein:
in said two stage thermostat mode said first control output first functions to initiate operation of said furnace at said first cooling rate thereof, and is thereafter operative to initiate operation of said furnace at said second cooling rate thereof in response to the detection by said control means of receipt of a thermostat-generated heat transfer demand signal at said second thermostat input portion of said controller, and
in said single stage thermostat mode said second control output first functions to initiate operation of said furnace at said first cooling rate thereof, and is thereafter operative to initiate operation of said furnace at said second cooling rate thereof after expiration of a predetermined delay period.

20. Heat transfer apparatus comprising:
a heat transfer device having selectable first and second heat transfer rates, said second heat transfer rate being higher than said first heat transfer rate; and
a controller connected to said heat transfer device and interchangeably connectable to either a single stage thermostat or a two stage thermostat, said controller being operative to receive at least one heat transfer rate demand signal from the thermostat to which it is connected and responsively regulate the operation of said heat transfer device, said controller including:
a first thermostat input portion for receiving a thermostat-generated low heat transfer rate demand signal,
a second thermostat input portion for receiving a thermostat-generated high heat transfer rate demand signal, and
(1) automatically determine, by interpreting signal receipt at said first and second thermostat input portions, whether said controller is connected to a single stage thermostat or a two stage thermostat,
(2) generate a first control output useable to regulate the operation of the heat transfer device in a first mode when said controller is connected to a two stage thermostat, and
(3) generate a second control output useable to regulate the operation of the heat transfer device in a second mode when said controller is connected to a single stage thermostat.

21. The heat transfer apparatus of claim 20 wherein said heat transfer device is a heating furnace, said first and second heat transfer rates are heating rates, and said high and low heat transfer rate demand signals are high and low heating demand signals.

22. The heat transfer apparatus of claim 21 wherein said furnace is a fuel-fired heating furnace.

23. The heat transfer apparatus of claim 21 wherein:
in said first mode said first control output first functions to initiate operation of said furnace at said first heating rate thereof, and is thereafter operative to initiate operation of said furnace at said second heating rate thereof in response to the detection by said control means of receipt of a thermostat-generated heat transfer demand signal at said second thermostat input portion of said controller, and
in said second mode said second control output first functions to initiate operation of said furnace at said first heating rate thereof, and is thereafter operative to initiate operation of said furnace at said second heating rate thereof after expiration of a predetermined delay period.

24. The heat transfer apparatus of claim 20 wherein said heat transfer device is a heating/cooling furnace, said first and second heat transfer rates are cooling rates, and said high and low heat transfer rate demand signals are high and low cooling demand signals.

25. The heat transfer apparatus of claim 24 wherein:
in said first mode said first control output first functions to initiate operation of said furnace at said first cooling rate thereof, and is thereafter operative to initiate operation of said furnace at said second cooling rate thereof in response to the detection by said control means of receipt of a thermostat-generated heat transfer demand signal at said second thermostat input portion of said controller, and
in said second mode said second control output first functions to initiate operation of said furnace at said first cooling rate thereof, and is thereafter operative to initiate operation of said furnace at said second cooling rate thereof after expiration of a predetermined delay period.

26. A method of using a thermostat to regulate the operation of a heat transfer device having selectively operable first and second heat transfer stages, said method comprising the steps of:
operatively connecting a controller to said heat transfer device;
connecting a thermostat to said controller, said thermostat being selected from the group consisting of a single stage thermostat and a two stage thermostat;
transmitting a heat transfer demand output from the selected thermostat to said controller; and
causing said controller, without modification thereof, to determine from said heat transfer demand output whether the selected thermostat is a single stage thermostat or a two stage thermostat and responsively initiate the regulation of said first and second heat transfer stages in a first mode if the selected thermostat is a two stage thermostat, and in a second mode different than said first mode if the selected thermostat is a single stage thermostat.

27. The method of claim 26 wherein:

said controller has low and high heat transfer demand input portions each adapted to receive said heat transfer demand signal, and said causing step is performed by causing said controller to initiate the first regulation mode in response to receipt of said heat transfer demand output only at said low heat transfer demand input portion, and to initiate the second regulation mode in response to receipt of said heat transfer demand output only at said high heat transfer demand input portion.

* * * * *